US011089779B2

(12) United States Patent
Ganguly-Mink et al.

(10) Patent No.: US 11,089,779 B2
(45) Date of Patent: Aug. 17, 2021

(54) COMPOSITION FOR DISINFECTING SURFACES CONTAINING TUBERCULOSIS CAUSING BACTERIA

(71) Applicant: Stepan Company, Northfield, IL (US)

(72) Inventors: Sangeeta Ganguly-Mink, Chicago, IL (US); Kenneth J. Littel, Hawthorne Woods, IL (US); Shui Ping Zhu, Phoenixville, PA (US)

(73) Assignee: Stepan Company, Northfield, IL (US)

( * ) Notice: Subject to any disclaimer, the term of this patent is extended or adjusted under 35 U.S.C. 154(b) by 0 days.

(21) Appl. No.: 16/598,053

(22) Filed: Oct. 10, 2019

(65) Prior Publication Data

US 2020/0085042 A1      Mar. 19, 2020

Related U.S. Application Data

(63) Continuation of application No. PCT/US2018/027021, filed on Apr. 11, 2018.

(60) Provisional application No. 62/484,297, filed on Apr. 11, 2017.

(51) Int. Cl.
| | | |
|---|---|---|
| *C11D 1/62* | (2006.01) | |
| *A01N 33/12* | (2006.01) | |
| *A01N 25/02* | (2006.01) | |
| *A01N 25/30* | (2006.01) | |

(52) U.S. Cl.
CPC .............. *A01N 33/12* (2013.01); *A01N 25/02* (2013.01); *A01N 25/30* (2013.01)

(58) Field of Classification Search
CPC ........... C11D 1/62; C11D 1/172; C11D 1/835; C11D 1/88; C11D 1/94; C11D 3/32; C11D 3/48; C11D 7/3218; C11D 11/0023
See application file for complete search history.

(56) References Cited

U.S. PATENT DOCUMENTS

| | | | |
|---|---|---|---|
| 3,250,794 A | 5/1966 | Mod et al. | |
| 5,444,094 A | 8/1995 | Malik et al. | |
| 5,874,453 A | 2/1999 | Oppong et al. | |
| 5,908,854 A | 6/1999 | McCue et al. | |
| 6,245,361 B1 | 6/2001 | Merritt | |
| 9,127,239 B2 | 9/2015 | Garner | |
| 2003/0165402 A1 | 9/2003 | Sava et al. | |
| 2005/0065215 A1 | 3/2005 | Biering et al. | |
| 2006/0094638 A1 | 5/2006 | Mohr et al. | |
| 2007/0270612 A1 | 11/2007 | Pompeo et al. | |
| 2009/0124526 A1* | 5/2009 | De Leersnyder | ........ C11D 3/10 510/191 |
| 2012/0295831 A1* | 11/2012 | Masters | ................. C11D 1/521 510/432 |
| 2015/0045223 A1 | 2/2015 | Shaw | |
| 2015/0098745 A1 | 4/2015 | Brown et al. | |
| 2015/0225674 A1* | 8/2015 | Masters | ............... C11D 3/2082 510/365 |
| 2015/0252310 A1* | 9/2015 | Blattner | .............. C11D 11/0023 510/235 |
| 2016/0066571 A1 | 3/2016 | Lei et al. | |
| 2016/0106094 A1 | 4/2016 | Oliveira et al. | |
| 2019/0090481 A1* | 3/2019 | Satterlee | ................ A01N 33/12 |

FOREIGN PATENT DOCUMENTS

| | | |
|---|---|---|
| DE | 2711577 | 9/1978 |
| EP | 0242918 | 10/1987 |
| GB | 2298791 | 9/1996 |
| WO | 2004029017 | 4/2004 |
| WO | 2015078496 | 6/2015 |
| WO | 2016205050 | 12/2016 |

OTHER PUBLICATIONS

International Searching Authority, "International Search Report and Written Opinion," issued in connection with International Patent Application No. PCT/US18/27021, dated Jul. 9, 2018, 10 pages.
International Searching Authority, "International Preliminary Report on Patentability," issued in connection with International Patent Application No. PCT/US18/27021, dated Oct. 15, 2019, 7 pages.
Europe Patent Office, Search Report, Application No. 18784299.2, dated Dec. 8, 2020, 8 pages.

* cited by examiner

*Primary Examiner* — Charles I Boyer
(74) *Attorney, Agent, or Firm* — McAndrews, Held & Malloy, Ltd.

(57) ABSTRACT

A disinfectant composition that is effective against tuberculosis-causing bacteria is disclosed. The composition contains a disinfectant agent that is a combination of biocidal quaternary ammonium compound and an N,N-di-substituted alkylamide water insoluble solvent. The composition can be a concentrated formulation or a ready-to-use formulation. Methods of disinfecting surfaces containing tuberculosis-causing bacteria are also disclosed.

20 Claims, No Drawings

COMPOSITION FOR DISINFECTING SURFACES CONTAINING TUBERCULOSIS CAUSING BACTERIA

CROSS-REFERENCE TO RELATED APPLICATIONS

This application is a continuation of and claims priority to PCT Application No. US18/27021, filed Apr. 11, 2018, which claims priority to U.S. Provisional Application No. 62/484,297, filed Apr. 11, 2017. The entire specifications of the PCT and provisional applications referred to above are hereby incorporated by reference.

FIELD OF THE INVENTION

The invention relates to quaternary ammonium antimicrobial compositions. More specifically, the invention relates to compositions having mycobactericidal and tuberculocidal efficacy. The compositions comprise a biocidal quaternary ammonium compound in combination with a water insoluble, di-substituted alkylamide solvent.

BACKGROUND OF THE INVENTION

Quaternary ammonium compounds have been used as disinfectants for many years, and these compounds have broad spectrum antimicrobial activity. Although formulations containing higher concentrations of quaternary ammonium compounds are known to be effective against certain gram positive and gram negative bacteria, these formulations are typically not very effective against tuberculosis-causing bacteria.

U.S. Pat. No. 5,444,094 discloses an effective tuberculocide composition that comprises a quaternary ammonium salt and a minimum concentration of at least 8% by weight of a glycol ether. In particular, the compositions have a weight ratio of glycol ether to quaternary ammonium salt of at least 4:1, and preferably 40:1. Although the compositions have tuberculocidal efficacy, glycol ethers are volatile organic compounds (VOCs), which are undesirable from an environmental standpoint. Moreover, stricter regulations limiting VOCs have been proposed, making it important to limit the use of glycol ethers.

U.S. Pat. No. 5,908,854 discloses an aqueous disinfectant composition effective against mycobacteria, wherein the composition comprises a germicidal cationic quaternary ammonium compound and a phenoxyalcohol or glycol ether solvent.

PCT published application WO 2015/078496 discloses disinfectant cleaner compositions that are said to have tuberculocidal and mycobactericidal efficacy and/or efficacy against Norovirus, Adenovirus, and Polyomavirus. The compositions comprise a particular quaternary ammonium chloride, namely N-alkyl dimethyl benzyl ammonium chloride, in combination with bis(3-aminopropyl)alkylamine, in specific weight ratios.

U.S. Published Application No. 2006/0094638 discloses a composition having tuberculocidal efficacy, wherein the composition comprises a quaternary ammonium compound, a guanidine derivative, and an alkylamine.

U.S. Pat. No. 6,245,361 discloses that a composition comprising a quaternary ammonium compound in combination with a chlorine bleach can be an effective disinfectant against mycobacteria.

There is still a need for improved antimicrobial compositions that have tuberculocidal and mycobactericidal efficacy, and which have low toxicity, low VOC, and low impact on the environment.

BRIEF SUMMARY OF THE INVENTION

In one aspect, this disclosures provides a disinfectant composition comprising (a) at least one biocidal quaternary ammonium compound; (b) at least one N,N-di-substituted alkylamide water insoluble solvent; and (c) a liquid carrier to 100% by weight of the composition.

In a further aspect, this disclosure provides a disinfectant composition comprising from 0.05% to 50% by weight of a biocidal quaternary ammonium compound; from 0.05% to 50% by weight of an N,N-di-substituted alkylamide water insoluble solvent; and a carrier to 100% by weight of the composition.

In a still further aspect, this disclosure provides a method of disinfecting a hard surface, particularly a hard surface containing or suspected to contain tuberculosis-containing bacteria. The method comprises contacting the hard surface with a disinfectant composition comprising from 0.05% to 50% by weight of a biocidal quaternary ammonium compound; from 0.05% to 50% by weight of an N,N-di-substituted alkylamide water insoluble solvent; and a carrier to 100% by weight of the composition.

DETAILED DESCRIPTION OF THE INVENTION

The compositions of the present technology comprise a quaternary ammonium compound and an N,N-alkyl di-substituted alkyl amide that together are an effective disinfecting agent against a variety of bacteria, including tuberculosis-causing bacteria.

The compositions may also contain additional components, such as surfactants, solubilizers, pH adjusters, pH buffers, chelating agents, rheological modifiers, dyes, and fragrances. In some embodiments, the compositions are free of alcohols.

Suitable quaternary ammonium compounds for use herein have the general formula:

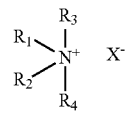

where $R_1$ is a straight or branched, saturated or unsaturated, alkyl or alkene chain having from 6 to 22, preferably from 8 to 18 carbon atoms;
$R_2$ is a straight or branched, saturated or unsaturated, alkyl or alkene chain having from 1 to 16 carbon atoms, preferably from 1 to 10 carbon atoms;
$R_3$ is methyl, ethyl, benzyl or ethylbenzyl;
$R_4$ is methyl or ethyl; and
$X^-$ is: $Cl^-$, $Br^-$, $F^-$, $I^-$, $(SO_4^{2-})_{1/2}$, $CH_3OSO_3^-$, $HCO_3^-$, $(CO_3^{2-})_{1/2}$, $CH_2COO^-$.

Exemplary quaternary ammonium compounds within the general formula include alkyl trimethyl ammonium halide, dialkyl dimethyl ammonium halide, alkyl dimethyl benzyl ammonium halide, dialkyl methyl benzyl halide, alkyl dimethyl ethylbenzyl ammonium halide, and dialkyl methyl ethylbenzyl ammonium halide. Specific quaternary ammonium salts include didecyl dimethyl ammonium chloride, dioctyl dimethyl ammonium chloride, octyl decyl dimethyl ammonium chloride, ($C_{12}$-$C_{18}$)-alkyl dimethyl benzyl ammonium chloride, and ($C_{12}$-$C_{18}$)-alkyl dimethyl ethylbenzyl ammonium chloride. The quaternary ammonium compound need not be a single entity, but may be a blend of two or more quaternary ammonium compounds.

A disinfectant composition of the present technology, in the form of a concentrate, may comprise from about 0.05% to about 50% by weight, based on the total weight of the composition, alternatively about 1% to about 25% by weight, alternatively about 8% to about 16% by weight of quaternary ammonium compound. In some embodiments, the amount of the quaternary ammonium compound is 16% by weight of the total concentrate composition. A disinfectant composition of the present technology, in the form of a ready-to-use (or diluted) composition, may comprise from about 100 ppm to about 10,000 ppm, alternatively about 200 ppm, about 300 ppm, about 400 ppm, about 500 ppm, about 600 ppm, or about 700 ppm to about 5000 ppm, about 6000 ppm, about 7000 ppm, or about 8000 ppm, of the quaternary ammonium compound, based on the total weight of the composition. In some embodiments, the amount of the quaternary ammonium compound is 5000 ppm by weight of the ready-to-use disinfectant.

The water insoluble di-substituted alkylamide has the following general structure:

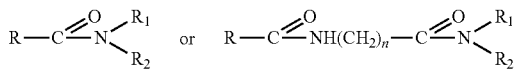

where R is a straight or branched, saturated or unsaturated, alkyl or alkene group having from 4 to 16, preferably from 8 to 10 carbon atoms, n=2 or 3; and
$R_1$ and $R_2$ are independently an alkyl group having from 1 to 4 carbon atoms. In one embodiment, the water insoluble solvent is an N,N-dimethyl alkyl amide having from 8 to 10 carbon atoms in the alkyl group.

When the disinfectant composition of the present technology is in the form of a concentrate, the composition may comprise from about 0.05% to about 50% by weight, based on the weight of the composition, of N,N-di-substituted alkylamide, alternatively about 1%, about 2%, about 3%, about 4%, about 5%, about 6%, about 7%, or about 8% by weight to about 16%, about 17%, about 18%, about 19%, about 20%, about 25%, or about 29% by weight. When the disinfectant composition is a ready-to-use (or diluted) composition, the composition may comprise from about 100 ppm to about 10,000 ppm of N,N-di-substituted alkylamide, alternatively about 200 ppm, about 300 ppm, about 400 ppm, about 500 ppm, about 600 ppm, or about 700 ppm to about 5000 ppm, about 6000 ppm, about 7000 ppm or about 8000 ppm, based on the total weight of the composition.

It has been surprisingly found that the combination of one or more quaternary ammonium compounds, and one or more N,N-di-substituted alkylamides provides an effective disinfecting agent against a variety of microbes, including tuberculosis-causing bacteria, *Pseudomonas aeruginosa* (Pa), *Staphylococcus aureus* (Sa), and *Salmonella enterica* (Se). Disinfectant compositions of the present technology are also effective against other microorganisms, including viruses, mildews, and fungi. In addition, the compositions of the present technology are efficacious without the need for any additional antimicrobial active. Without being bound by theory, it is believed that the one or more quaternary ammonium compounds combined with one or more N,N-di-substituted alkylamides forms a synergistic mixture that provides efficacy against a wide variety of microbes, including tuberculosis-causing bacteria. The use of glycol ether or alcohol solvents, chlorine bleaches, and guanidine derivatives can therefore be avoided in the disinfectant compositions of the present technology.

The disinfectant compositions of the present technology are in liquid form and comprise a carrier in addition to the quaternary ammonium compound and the N,N-di-substituted alkylamide. Water, either de-ionized or regular tap water, is a suitable carrier, particularly for a Ready-to-Use formulation. Water can be used alone as the carrier, or in combination with other suitable carriers. In some embodiments, the disinfectant composition is a liquid concentrate formulation that contains no added water. In such concentrate formulations, glycerin can be used as an environmentally friendly filler/carrier, which surprisingly also provides phase stability for the concentrated formula. These concentrate formulations can be diluted with water at, for example, a 1:32 dilution ratio, and surprisingly still have efficacy against tuberculosis-causing bacteria, as well as a wide variety of other biocidal targets, such as other types of bacteria, viruses, fungi, and yeasts.

One or more optional components can be included in the present disinfectant compositions depending on the end use. For example, one or more surfactants can be added to the compositions to improve cleaning, detergency, and/or microbiocidal efficacy. Surfactants are particularly useful in one-step disinfecting formulations, since no pre-cleaning step is needed to first remove dirt and filth. Surfactants also help to wet the surface and thereby enable the combination of quaternary ammonium compound and N,N-di-substituted alkylamide to kill microorganisms more effectively. In the present disinfectant compositions, surfactants also help to solubilize the water insoluble N,N-di-substituted alkylamide solvent, and any water insoluble fragrances. The surfactants can be non-ionic or amphoteric/zwitterionic surfactants, or combinations thereof. Examples of useful nonionic surfactants that can be used in the disinfectant composition include fatty alcohols having from 5 to 18, preferably 6 to 12 carbon atoms in the alkyl chain, further ethoxylated with from 5 to 15, preferably 6 to 9 ethylene oxide units. Such non-ionic surfactants could also include some propylene oxide units, provided there are sufficient ethylene oxide units to maintain water solubility of the surfactant. Although less preferred, ethoxylated alkyl phenols could also be used as a surfactant. Particularly useful non-ionic surfactants include, for example, Bio-Soft® N1-9 (ethoxylated C11 alkyl 9EO alcohol), available from Stepan Company, Northfield, Ill. Examples of useful amphoteric/zwitterionic surfactants include alkyl amine oxides, betaines, and sarcosinates. The surfactant is included in the composition in an amount such that the weight ratio of combined quaternary ammonium compound and surfactant(s) to di-substituted alkylamide is 1:10 to 10:1, preferably 1:3 to 3:1.

Other components or additives can also be included in the disinfectant compositions. Additional components can include pH adjustment agents, hydrotropic or other solubilizing agents for obtaining and maintaining a clear single phase concentrate or ready-to-use composition, electrolytes for enhancement of surfactant detergency, chelators for improvement of surfactant detergency and of cationic surfactant efficacy, fragrances for different attractive smells, dyes for pleasing color, and other functional ingredients.

In some embodiments, the final pH of a commercial product is more easily controlled within specification by including one or more water soluble primary amines as organic alkaline pH buffers in the formulation. Suitable primary amine buffers include 2-aminoethanol and 2-amino-2-methyl-1-propanol. When a Ready-To-Use formulation is made with water, any pH buffer agent with a pKa of larger than 8.5 (preferably larger than 9.0) can be used instead of the water soluble organic primary amines. The weight ratio of buffer to quaternary ammonium compound is in the range of 3:1 to 1:3, preferably 2:1 to 1:2.

Compositions according to the present technology can be supplied in different forms depending on the desired end use. In some embodiments, the composition is in a ready-to-use (RTU) form that can be used without dilution. In accordance with other embodiments of the present technology, the composition comprising the quaternary ammonium compound and N,N-di-substituted alkylamide is a dilutable concentrate product. A dilutable concentrate product is a product that needs to be diluted with a diluent (e.g., water) in a ratio of, for example but not limited to, 1:256, 1:128, 1:64, or 1:32 before it can be applied to articles or surfaces to be disinfected. Suitable dilution ratios for the present compositions in concentrate form range from 1:1 to 1:256, alternatively, 1:5 to 1:128, alternatively, 1:8 to 1:64. Depending on the intended dilution ratio, the concentration of actives in the dilutable concentrate product can vary.

In some embodiments of the present application, the disinfectant composition is envisioned to be used as a spray. The disinfectant composition may be used as a spray in an RTU formulation, or a concentrate formulation can be used as a spray using, for example, a 1:8, 1:10, 1:32, or a 1:64 dilution of the disinfectant composition. In some embodiments, the composition may be used in a wipe. In other embodiments, the composition may be used, for example, in a wipe used with an applicator pad. In some embodiments, the composition of the present application is envisioned to be a concentrate that can be packaged, for example, in a packet or pod that can be added to water at an appropriate dilution ratio.

In some embodiments, the present application provides a method of cleaning a hard surface by providing a disinfectant composition of the present technology at its end use concentration, and contacting at least one soiled surface or substrate with the composition for a set period of time and then removing the composition or soil from the surface or substrate.

Further, in other embodiments, the present application provides a method of disinfecting a hard surface by providing a disinfectant composition of the present technology at its end use concentration and contacting the at least one surface to be disinfected with the composition. In some embodiments, the surface to be disinfected is contacted for a specific amount of time, for example, for about 5 minutes or less, alternatively for about 3 minutes or less, and then the composition is removed from the surface.

The methods of contacting a surface with the disinfectant composition to clean and/or disinfect a hard surface are contemplated to be used with, for example, but not limited to, a mop, a sponge, a rag, a towel, a wipe, an automatic floor cleaning device, a manual floor cleaning device, a wet pad applicator, and the like.

The presently described technology and its advantages will be better understood by reference to the following examples. These examples are provided to describe specific embodiments of the present technology. By providing these specific examples, it is not intended to limit the scope and spirit of the present technology. It will be understood by those skilled in the art that the full scope of the presently described technology encompasses the subject matter defined by the claims appended to this specification, and any alterations, modifications, or equivalents of those claims.

The bacteria used in the examples include:
*Pseudomonas aeruginosa* (Pa): a highly resistant Gram negative bacterium, which is often used to substantiate the efficacy of disinfectants against Gram positive bacteria, available from American Type Culture Collection (ATCC), Manassas, Va. as ATCC 15442;
*Staphylococcus aureus* (Sa): a Gram positive bacterium, which is often used to substantiate the efficacy of disinfectants against Gram negative bacteria, available as ATCC 6538;
*Salmonella enterica* (Se): a facultative anaerobic Gram-negative bacterium, available as ATCC 10708.

The following materials are used in the examples:
BTC®888, an N-alkyl-dimethyl benzyl/dialkyl dimethyl quaternary ammonium compound available from Stepan Company, Northfield, Ill.;
BTC®1010, a didecyl dimethyl quaternary ammonium compound available from Stepan Company, Northfield, Ill.;
BTC®2125M, an N-alkyl dimethyl benzyl/N-alkyl dimethyl ethylbenzyl quaternary ammonium compound available from Stepan Company, Northfield, Ill.;
Bio-Soft® N91-6, an ethoxylated alcohol non-ionic surfactant available from Stepan Company, Northfield Ill.;
Hallcomid®-M-8-10 and Hallcomid®-M10, N,N-dimethyl-alkylamides available from Stepan Company, Northfield Ill.

Table 1 lists 5 Ready-To-Use formulations, and 1 concentrated formulation with a dilution rate of 1:32 by 250 ppm hard water. This screen test against tuberculosis-containing bacteria is conducted at test conditions of 3 minute contact time and 5% soil load. The method, Quantitative Modification to the AOAC Germicidal Spray Test Tuberculocidal, is developed by and proprietary to MicroBac.

TABLE 1

Formulations (based on 100% active) and TB test results by a quantitative screen method[1]

|  | Example 1 | Example 2 | Example 3 | Example 4 | Example 5 | Example 6 (1:32 dilution[2]) Conc./Diluted |
|---|---|---|---|---|---|---|
| Quat Active |  |  |  |  |  |  |
| BTC ®1010/quat Nonionic Surfactant/solubilizer | 0.50 | 0.25 | 0.50 | 0.50 | 0.30 | 16.00/0.50 |
| Bio-Soft ® N91-6 | 0.25 | 0.50 | 0.50 | 0.50 | 0.53 | 8.00/0.25 |

TABLE 1-continued

Formulations (based on 100% active) and TB test results by a quantitative screen method[1]

| | Example 1 | Example 2 | Example 3 | Example 4 | Example 5 | Example 6 (1:32 dilution[2]) Conc./Diluted |
|---|---|---|---|---|---|---|
| Solvent (water insoluble) | | | | | | |
| Hallcomid ®-M-8-10 (N,N-dimethylalkylamide) | 0.50 | 0.50 | 1.0 | 1.0 | | 16.00/0.50 |
| Solvent (water soluble) | | | | | | |
| 1,3-diethoxy-2-propanol | | | | | 8.00 | |
| Alkalinity provider | | | | | | |
| 2-aminoethanol (buffer) | 1.0 | 1.0 | 1.0 | 2.0 | | 32.00/1.00 |
| Sodium Metasilicate (buffer) | | | | | 0.26 | |
| EDTA (chelating & buffer | | | | | 1.60 | |
| Miscellaneous | | | | | | |
| Lemon Fragrance | 0.10 | 0.10 | 0.10 | 0.10 | 0.10 | 3.20/0.10 |
| Glycerin/filler | | | | | | 20.80/0.65 |
| water | to 100 | to 100 | to 100 | to 100 | to 100 | to 100/to 100 |
| pH | 11.5 | 11.5 | 11.5 | 11.6 | 12.3 | 11.5 |
| TB log reduction | 4.11[3] | 4.11 | 4.11 | 4.11 | 3.31 | 4.20 |
| | pass | pass | pass | pass | fail | pass |

[1] Quantitative Modification to the AOAC Germicidal Spray Test, proprietary method to MicroBac
[2] Diluted with 250 ppm AOAC hard water
[3] According to this screen method: log reduction of larger than 4.0 is considered "pass."

Table 1 shows that compositions that comprise the dialkylamide water insoluble solvent (Hallcomid® M-8-10) demonstrate effective killing of TB at quaternary ammonium compound amounts of 0.25% or 0.50%, but Formulation 5 with the water soluble solvent 1,3-diethoxy-2-propanol, fails the efficacy test, even at 8% solvent.

TABLE 2

Efficacy of Example 7 (based on 100% active) against Sa, Pa and Se at 400 ppm Hard Water & 5% soil load

| | Example 7 Concentrated | Example 7 dilution Diluted by 1:32 |
|---|---|---|
| Quat Active | | |
| BTC ®1010/quat | 16.0 | 0.50 |
| Nonionic Surfactant/solubilizer | | |
| Bio-Soft ® N91-6 | 8.0 | 0.25 |
| Solvent (water insoluble) | | |
| Hallcomid ®-M-8-10 | 16.0 | 0.50 |
| Alkalinity provider | | |
| 2-aminoethanol (buffer) | 32.0 | 1.00 |
| Miscellaneous | | |
| Lemon Fragrance | 1.6 | 0.05 |
| Glycerin | to 100 (including water from raw materials) | 0.7 |
| Water | | To 100 |
| Efficacy | | |
| Pa A-TCC #15442 | Not tested | 0/30, pass* |
| Sa-ATCC#6538 | | 0/30, pass* |
| Se-ATCC #10708 | | 0/30, pass* |

*AOAC Germicidal Spray Products Test (AOAC 961.02)

Table 2 shows the 1:32 dilution from the concentrated formulation of Example 7 passed the core organisms (Sa, Pa, and Se) by the current EPA UDT method at the 400 ppm hard water, 3 minute contact time and 5% soil load.

TABLE 3

Efficacy of Example 8 against Sa, Pa, Se at 2 minute contact time in presence of 250 ppm Hard Water & 5% soil load

| | Example 8 Concentrated As 100/As is | Example 8 dilution Diluted by 1:32 with 250 ppm hard water |
|---|---|---|
| Quat Active | | |
| BTC ®1010-80%/quat | 16.0/20.0 | 0.50/0.63 |
| Nonionic Surfactant/solubilizer | | |
| Bio-Soft ® N9-1 | 8.0/8.0 | 0.25/0.25 |
| Solvent (water insoluble) | | |
| Hallcomid ®-M-8-10 | 16.0/16.0 | 0.50/0.5 |
| Alkalinity provider | | |
| 2-aminoethanol (buffer)-99% | 27.12/27.4 | 0.85/0.86 |
| 2-amino-2-methyl-1-propanol-95% | 2.60/2.74 | 0.08/0.08 |
| Miscellaneous | | |
| Lemon Fragrance | 1.6/1.6 | 0.05/0.05 |
| Glycerine-99.7% | /24.26 | /0.76 |
| AOAC 250 ppm Hard water | | /96.87 |
| Efficacy: | | |
| AOAC Germicidal Spray Test | | |
| Pa A-TCC #15442 | Not tested | 0/60, pass |
| Sa-ATCC#6538 | | 0/60, pass |
| Se-ATCC #10708 | | 1/60, pass |

Table 3 shows the 1:32 dilution of the Example 8 formulation, with 0.5% quaternary ammonium compound and 0.5% N,N-dimethylalkylamide, passed the efficacy test against 3 core organisms, Pa, Sa, and Se, at a 2 minute contact time.

The Example 8 formulation, at 1:32 dilution, was also tested for efficacy against several different organisms in the presence of 250 ppm hard water and a 5% soil load. The organisms tested, the test contact time in minutes, and the efficacy results are set forth in Table 4.

TABLE 4

Efficacy of Example 8 against microorganisms

| Organism | Organism Source | Contact Time (min.) | Result |
|---|---|---|---|
| MRSA | ATCC 33593 | 2 | pass |
| New Delhi Metallo-Lactamase (NDM) Klebsiella pneumoniae | ATCC BAA-2146 | 2 | pass |
| Vancomycin-Resistant Enterococcus faecalis | ATCC 51575 | 2 | pass |
| Enterobacter aerogenes | ATCC 13048 | 2 | pass |
| Escherichia coli | ATCC 11229 | 2 | pass |
| Streptococcus pyogenes (Necrotizing Fasciitis Group A) | Strain MGAS9894, NR-15275 obtained through BEI Resources, NIAID, NIH | 2 | pass |
| Candida albicans | ATCC 10231 | 2 | pass |
| Trichophyton interdigitale | ATCC 9533 | 2 | pass |
| Duck Hepatitis B Virus | Duck Hepatitis B Virus (surrogate for Human Hepatitis B Virus), Strain: Grimaud, Hepadnavirus Testing Host cell line: Primary duck heptocytes | 2 | pass |
| Bovine Viral Diarrhea Virus (Hep C) | Bovine Viral Diarrhea Virus (surrogate for Human Hepatitis C Virus), Strain: NADL, American Bioresearch Laboratories Host cell line: MDBK, ATCC CCL-22 | 2 | pass |
| Feline Calicivirus | Feline Calicivirus (surrogate for Human Norovirus), Strain: F9, ATCC VR-782 Host cell line: CrFK, ATCC CCL-94 | 2 | pass |
| HIV-1 | Human Immunodeficiency Virus Type 1 (HIV-1), Strain: IIIB (B), ZeptoMetrix Host cell line: C8166 | 1 | pass |
| Influenza H3N2 | Influenza A Virus (H3N2), A/Hong Kong/8/68 Host cell line: MDCK cells, ATCC CCL-34 | 1 | pass |
| Rhinovirus Type 39 | Rhinovirus Type 39 (RV39), Strain 209, ATCC VR-340 Host cell line: H1-HeLa cells, ATCC CRL-1958 | 2 | pass |
| Mycobacterium tuberculosis BCG (Mycobacterium bovis) | Mycobacterium bovis (BCG), Organon Teknika, Corp. | 3 | pass |

Test Methods:

Bacteria: Official Methods of Analysis of the AOAC International, Chapter 6, Disinfectants, Official Method 961.02 Germicidal Spray Products as Disinfectants, current edition.

Fungi/Yeast: AOAC Germicidal Spray Products as Disinfectants Test (as above) modified for fungi.

Virus: Test Method for Efficacy of Virucidal Agents Intended for Inanimate Environmental Surfaces, ASTM Designation E1053, current edition.

The results in Table 4 show that the Example 8 formulation of the present technology has efficacy against a wide variety of organisms.

Additional example formulations according to the present technology were prepared and tested for efficacy against Pa. In Examples 9, 10, and 11, concentrated formulations were prepared that contained the same components and amounts as in the Example 8 concentrate, except that Example 9 used a different dialkylamide, Hallcomid®-M-10, instead of the dialkylamide of Example 8, and Examples 10 and 11 used different quaternary ammonium compounds, BTC®888 and BTC®2125M, respectively, instead of the quaternary ammonium compound used in Example 8. The efficacy of each of the Example 9, 10, and 11 formulations was tested at a 1:32 dilution using the AOAC Germicidal Spray Test (Official Method 961.02) in the presence of 250 ppm hard water and a 5% soil load. The results are shown in Table 5.

TABLE 5

Efficacy of Examples 9-11 against Pa

| Sample Identification | Results Organism: Psesudomonas aeruginosa (Pa) | |
|---|---|---|
| Example 9 Concentrate w/Hallcomid M-10 at 1:32 dilution | 0/30 | Pass |
| Example 10 Concentrate w/BTC 888 at 1:32 dilution | 0/30 | Pass |
| Example 11 Concentrate w/BTC 2125M-80% at 1:32 dilution | 0/30 | Pass |

The Table 5 results show that different combinations of quaternary ammonium compounds and dialkylamides, within the scope of the present technology, can be formulated into compositions having bacteriocidal efficacy.

The present technology is now described in such full, clear and concise terms as to enable a person skilled in the art to which it pertains, to practice the same. It is to be understood that the foregoing describes preferred embodiments of the present technology and that modifications can be made therein without departing from the spirit or scope of the present technology as set forth in the appended claims.

What is claimed is:

1. A liquid disinfectant composition comprising:
   (a) from 0.05% to 50% by weight of at least one biocidal quaternary ammonium compound;
   (b) from 0.05% to 50% by weight of at least one N,N-di-substituted alkylamide water insoluble solvent;
   (c) at least one water-soluble organic primary amine alkaline pH buffer;
   (d) a surfactant component consisting of one or more non-ionic surfactants, amphoteric/zwitterionic surfactants, or combinations thereof; and
   (e) a liquid carrier to 100% by weight of the composition.

2. The composition of claim 1, wherein the quaternary ammonium compound has the following chemical formula:

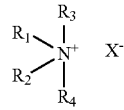

$R_1$ is a straight or branched, saturated or unsaturated, alkyl or alkene chain having from 6 to 22;
$R_2$ is a straight or branched, saturated or unsaturated, alkyl or alkene chain having from 1 to 16 carbon atoms;
$R_3$ is methyl, ethyl, benzyl or ethylbenzyl;
$R_4$ is methyl or ethyl; and
$X^-$ is: $Cl^-$, $Br^-$, $F^-$, $I^-$, $(SO_4^{2-})_{1/2}$, $CH_3OSO_3^-$, $HCO_3^-$, $(CO_3^{2-})_{1/2}$, $CH_2COO^-$.

3. The composition of claim 1, wherein the N,N-di-substituted-alkylamide water insoluble solvent has the following chemical formula:

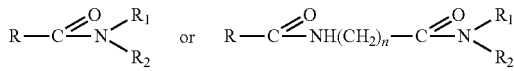

R is a straight or branched, saturated or unsaturated, alkyl or alkene group having from 4 to 16;
R1 and R2 are independently an alkyl group having from 1 to 4 carbon atoms; and
n is 2 or 3.

4. The composition of claim 1, wherein the composition further comprises one or more additional components selected from pH adjusting agents, fragrances, dyes, and rheological modifiers.

5. The composition of claim 1, wherein the nonionic surfactant is a fatty alcohol ethoxylate.

6. The composition of claim 1, wherein the primary amine is 2-aminoethanol or 2-amino-2-methyl-1-propanol.

7. The composition of claim 1, wherein the composition is a concentrate, and the amount of quaternary ammonium compound in the composition is from 1% to 50% by weight of the composition.

8. The composition of claim 7, wherein the amount of the alkylamide water insoluble solvent is from 1% to 50% by weight of the composition.

9. The composition of claim 1, wherein the carrier is water.

10. The composition of claim 1, wherein the carrier is glycerin.

11. A method of disinfecting a surface containing or suspected to contain tuberculosis-causing bacteria, comprising the steps of:
    (a) providing a disinfectant composition comprising:
        (i) from 0.05% to 50% by weight of a biocidal quaternary ammonium compound;
        (ii) from 0.05% to 50% by weight of an N,N-di-substituted alkylamide water insoluble solvent;
        (iii) at least one water-soluble organic primary amine alkaline pH buffer;
        (iv) a surfactant component consisting of one or more non-ionic surfactants, amphoteric/zwitterionic surfactants, or combinations thereof; and
        (v) a carrier to 100% by weight of the composition; and
    (b) contacting the surface with an effective amount of the disinfectant composition to disinfect the surface.

12. The method of claim 11, wherein the biocidal quaternary ammonium compound has the following chemical formula:

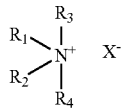

$R_1$ is a straight or branched, saturated or unsaturated, alkyl or alkene chain having from 6 to 22, preferably from 8 to 18 carbon atoms;
$R_2$ is a straight or branched, saturated or unsaturated, alkyl or alkene chain having from 1 to 16 carbon atoms, preferably from 1 to 10 carbon atoms;
$R_3$ is methyl, ethyl, benzyl or ethylbenzyl;
$R_4$ is methyl or ethyl; and
$X^-$ is: $Cl^-$, $Br^-$, $F^-$, $I^-$, $(SO_4^{2-})_{1/2}$, $CH_3OSO_3^-$, $HCO_3^-$, $(CO_3^{2-})_{1/2}$, $CH_2COO^-$.

13. The method of claim 11, wherein the N,N-di-substituted-alkylamide water insoluble solvent has the following chemical formula:

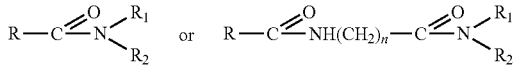

R is a straight or branched, saturated or unsaturated, alkyl or alkene group having from 4 to 16, preferably from 8 to 10 carbon atoms;
R1 and R2 are independently an alkyl group having from 1 to 4 carbon atoms, preferably 1 carbon atom; and
n is 2 or 3.

14. The method of claim 11, wherein the composition is a concentrate, and the amount of quaternary ammonium compound in the composition is from 1% to 25% by weight of the composition.

15. The method of claim 14, wherein the amount of the alkylamide water insoluble solvent is from 1% to 25% by weight of the composition.

16. The method of claim 14 wherein the composition is diluted prior to the contacting step at a dilution ratio of from 1:1 to 1:256, or from 1:5 to 1:128, or from 1:8 to 1:64.

17. The composition of claim 1, wherein the weight ratio of organic primary amine alkaline pH buffer to quaternary ammonium compound is 4:1 to 1:3.

18. The composition of claim 1, wherein the surfactant component is present in an amount such that the weight ratio of combined biocidal quaternary ammonium compound and surfactant component to N,N-di-substituted alkyl amide is 1:10 to 10:1.

19. The method of claim 11 wherein the weight ratio of organic primary amine alkaline pH buffer to quaternary ammonium compound is 4:1 to 1:3.

20. The method of claim 11, wherein the organic primary alkaline pH buffer is 2-aminoethanol or 2-amino-2-methyl-1-propanol.

* * * * *